(12) United States Patent
Gupta

(10) Patent No.: US 7,896,417 B2
(45) Date of Patent: Mar. 1, 2011

(54) GRAB HANDLE BRACKET

(75) Inventor: Sameer Gupta, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 8 days.

(21) Appl. No.: 12/533,670

(22) Filed: Jul. 31, 2009

(65) Prior Publication Data

US 2011/0025083 A1    Feb. 3, 2011

(51) Int. Cl.
*B60N 3/02* (2006.01)
(52) U.S. Cl. .......................... 296/1.02; 296/214; 296/71
(58) Field of Classification Search ................ 296/214, 296/1.02, 71; 16/110.1–114, 405–430; 280/748–752
See application file for complete search history.

(56) References Cited

U.S. PATENT DOCUMENTS

| 6,869,119 | B2 | 3/2005 | Ito et al. |
| 2007/0132261 | A1 | 6/2007 | Ehrlich et al. |
| 2008/0111389 | A1 | 5/2008 | Benkler et al. |

FOREIGN PATENT DOCUMENTS

| DE | 10140338 A1 | 2/2003 |
| JP | 10-181490 | 7/1998 |
| JP | 2001-233110 | 8/2001 |
| JP | 2005-035357 | 2/2005 |
| JP | 02009126297 A * | 6/2010 |

* cited by examiner

*Primary Examiner* — Dennis H Pedder
(74) *Attorney, Agent, or Firm* — Rankin Hill & Clark LLP

(57) ABSTRACT

A mounting bracket for a vehicle grab handle includes spaced apart first and second roof attachment portions for mounting to a roof side rail and spaced apart first and second support portions depending downwardly toward a vehicle cabin. The first support portion depends from the first attachment portion and the second support portion depends from the second attachment portion. An interconnecting portion extends between the spaced apart first and said second support portions for mounting the vehicle grab handle. At least one reinforcing flange extends along at least one longitudinal edge defined by the roof attachment portions and the support portions. The at least one reinforcing flange extends from one or both of the first and second attachment portions a limited distance to a location spaced apart from the interconnecting portion.

20 Claims, 4 Drawing Sheets

US 7,896,417 B2

GRAB HANDLE BRACKET

BACKGROUND

The present disclosure is directed toward a mounting bracket for a vehicle grab handle and, more specifically, to a mounting bracket having a weakened area and/or at least one reinforcing flange.

Many vehicles include one or more grab handle assemblies provided inside the passenger cabin. In one configuration, grab handle assemblies are provided along opposite roof side rail areas adjacent the exterior doors of the vehicle to assist the driver and/or any passengers when entering or exiting the vehicle. Each grab handle assembly can include a mounting bracket and a handle pivotally mounted to the bracket. The handle provides those entering and exiting the vehicle a convenient structure to hold onto.

Ideally, the mounting bracket provides enough strength for handling a forceful tug and/or pull by a passenger grabbing the handle and pulling downward on it; however, the bracket should be configured such that the grab handle assembly crushes appropriately when impacted during a collision. In particular, the bracket should be configured so that the handle does not feel weak when grabbed, but the bracket should not be too strong or rigid such that it results in a high Head Impact Criterion (HIC) number during a Free Motion Headform (FMH) test (i.e., a test prescribed by the National Highway Traffic Safety Administration (NHTSA) for simulating a person's head impacting an interior vehicle area or component). Often, these are competing considerations in the design of grab handle mounting brackets.

SUMMARY

A first exemplary embodiment of the disclosure is directed toward a mounting bracket for a vehicle grab handle. The mounting bracket includes spaced apart first and second roof attachment portions for mounting to a roof side rail. Spaced apart first and second support portions depend downwardly toward a vehicle cabin. The first support portion depends from the first attachment portion and the second support portion depends from the second attachment portion. An interconnecting portion extends between the spaced apart first and said second support portions for mounting the vehicle grab handle. At least one reinforcing flange extends along at least one longitudinal edge defined by the roof attachment portions and the support portions. The at least one reinforcing flange extends from one or both of the first and second attachment portions a limited distance to a location spaced apart from the interconnecting portion.

A second exemplary embodiment of the disclosure is directed toward a bracket for a grab handle mounted to a vehicle side rail. The bracket comprises an attachment portion for mounting the grab handle to the side rail, a support portion depending downwardly from the attachment portion, and a weakened area formed along the support portion.

A third exemplary embodiment of the disclosure is directed toward a vehicle grab handle assembly mounted to a vehicle side rail. The grab handle assembly comprises a bracket including attachment portions for mounting to the vehicle side rail, support portions depending downwardly from the attachment portions, and an interconnecting portion extending between the support portions. The support portions include reinforcing flanges extending downwardly from a limited length of one or both longitudinal edges of the support portion, and further include an aperture formed through the support portions.

DETAILED DESCRIPTION

Figure 1:
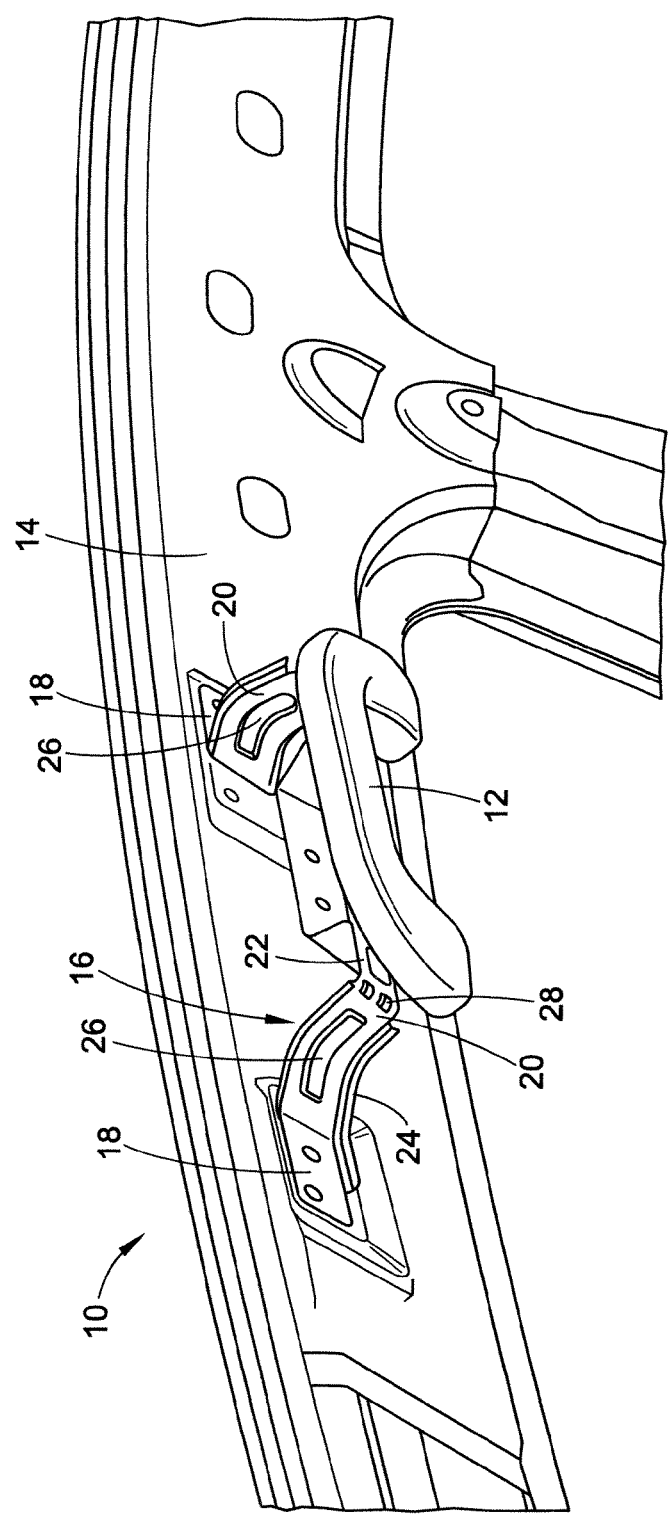
FIG. 1 is a perspective view of a known grab handle assembly having a grab handle secured to a vehicle side rail by a mounting bracket.
Figure 2:
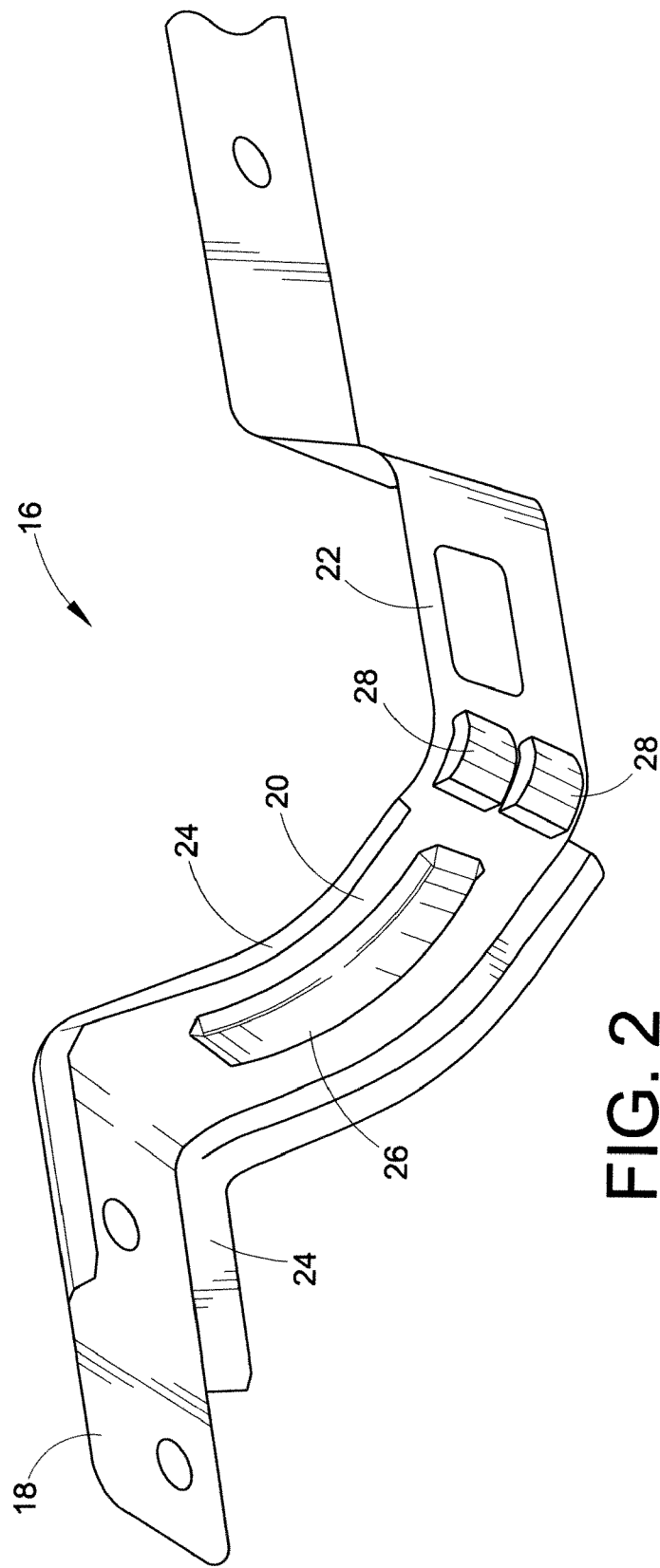
FIG. 2 is a partial enlarged perspective view of the known mounting bracket shown in FIG. 1.

The present disclosure is directed toward a mounting bracket for securing a vehicle grab handle to a roof side rail. With reference to FIG. 1, one known grab handle assembly 10 includes a grab handle 12 secured to a vehicle side rail 14 (e.g., a roof rail) by a mounting bracket 16. The mounting bracket 16 of this grab handle assembly 10 includes roof attachment portions 18 and spaced apart support portions 20 depending downwardly from roof attachment portions 18, respectively. An interconnecting portion 22 spans between the spaced apart support portions 20 and has the grab handle 12 pivotally secured directly thereto. With additional reference to FIG. 2, one half of the mounting bracket 16 is illustrated. As shown, a pair of reinforcing flanges 24 extends along opposite longitudinal edges of the bracket 16 spanning across approximately one half of the attachment portion 18 and approximately an entire longitudinal extent of the support portion 20. The support portion 20 of the mounting bracket 10 further includes an embossment 26 extending along its majority length to impart strength and rigidity to the bracket 16. A pair of gussets 28 are formed on the surface of the mounting bracket 16 where the support portion 20 meets the interconnecting portion 22 interconnecting the support portion of FIG. 2 to an opposite support portion, which is similarly constructed.

The embossment 26 and the reinforcing flanges 24 provide greater strength and rigidity to the mounting bracket 10. More specifically, the support portion 20 provides greater resistance to opposing forces in the form of a pull by a passenger grabbing and manipulating the handle. Such greater resistance is a desirable characteristic in the grab handle assembly, but often competes with the need for the handle assembly to exhibit desirable crush characteristics.

Figure 3:
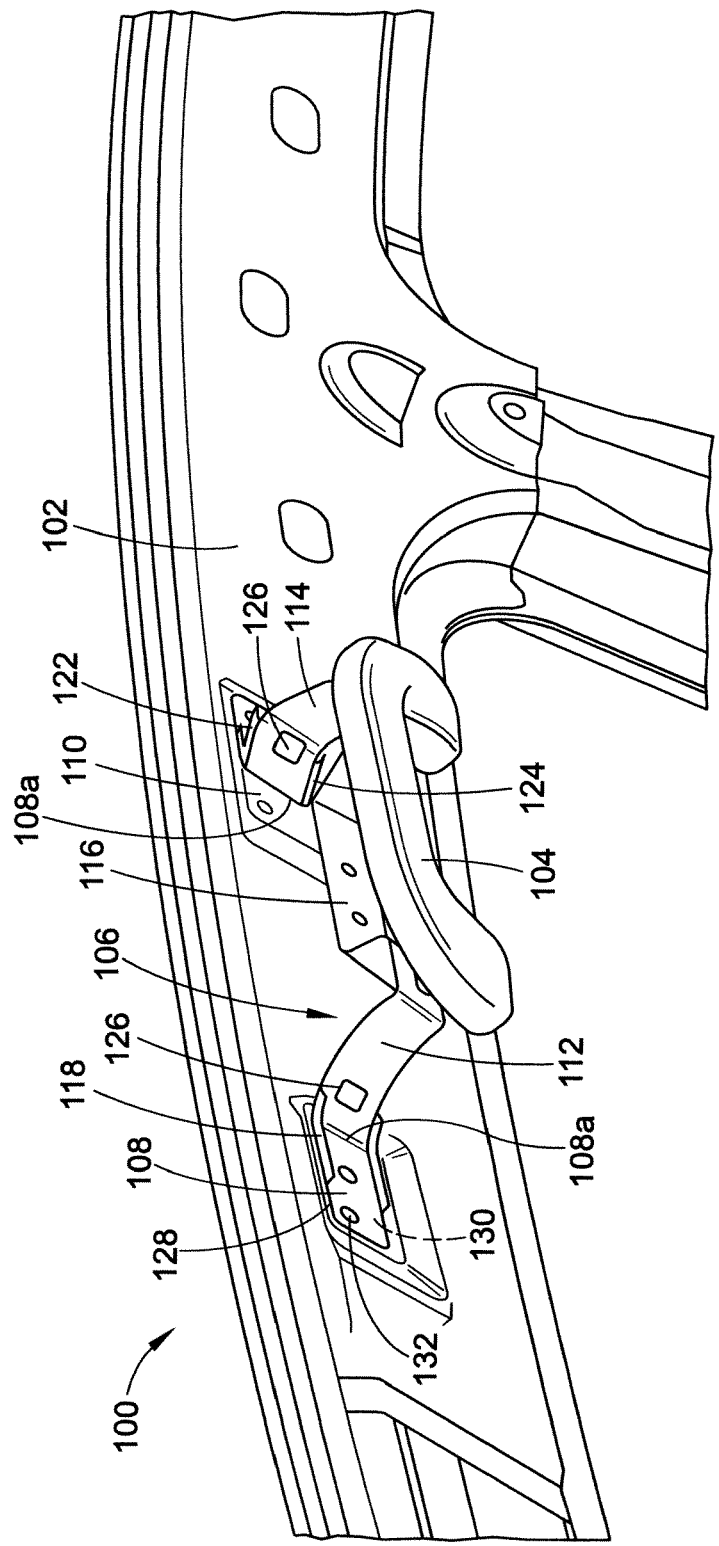
FIG. 3 is a perspective view of a grab handle assembly having a grab handle secured to a vehicle side rail by an improved mounting bracket according to an exemplary embodiment; and, FIG. 4 is partial enlarged perspective view of the mounting bracket of FIG. 3.

With reference to FIG. 3, an improved vehicle grab handle assembly 100 is shown mounted to a vehicle side rail 102 according to one exemplary embodiment. The grab handle assembly 100 includes a vehicle grab handle 104 and a mounting bracket 106 for the vehicle grab handle. In particular, the mounting bracket 106 mounts or secures the grab handle 104 to the vehicle side rail 102. The mounting bracket 106 includes spaced apart first and second roof attachment portions 108, 110 for mounting to the vehicle side rail 102 and spaced apart first and second legs or support portions 112, 114 depending downwardly toward or into a vehicle cabin. In particular, the first support portion 112 depends from the first attachment portion 108 and the second support portion 114 depends from the second attachment portion 110. An interconnecting portion 116 extends between the spaced apart first and second support portions 112, 114 at a location spaced apart from the side rail 102 for mounting the vehicle grab handle 104 (i.e., the grab handle 104 is directly mounted or secured to the interconnecting portion 116).

As will be described in more detail below, the mounting bracket 106 includes at least one reinforcing flange (e.g., flange 118) extending along at least one longitudinal edge of the bracket 106 defined by the roof attachment portions 108, 110 and the support portions 112, 114. In particular, the at least one flange 118 extends from one or both of the attachment portions 108, 110 along the corresponding support portion or portions 112, 114 to a location spaced apart from the interconnecting portion 116. In addition, or in the alternative, the mounting bracket 106 can include a weakened area (e.g., aperture 126) disposed or formed along one or both of the support portions 112, 114.

Figure 4:
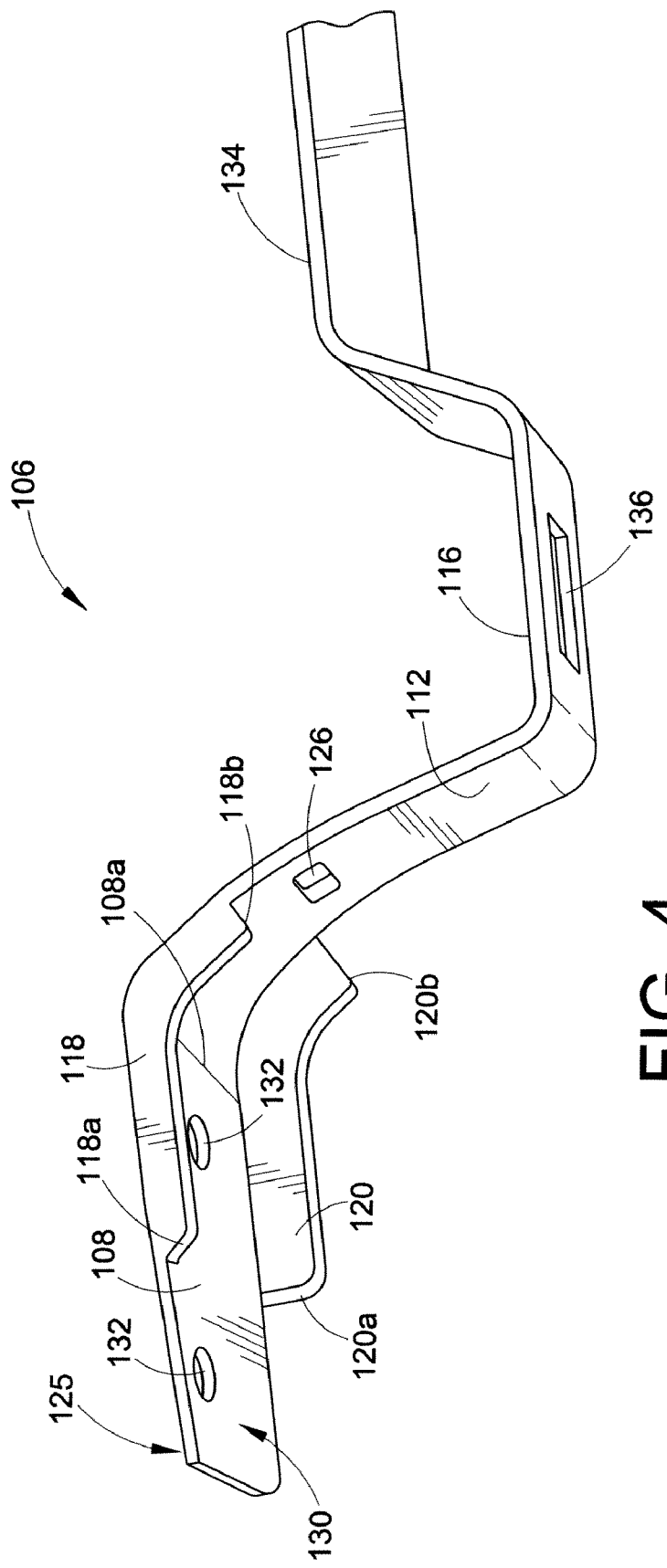

With additional reference to FIG. 4, one side of the mounting bracket 106 (i.e., the side having the attachment portion 108 and support portion 112) is shown and will be described in particular detail. It is to be appreciated that the other side of the mounting bracket 106 (i.e., the side having the attachment portion 110 and the support portion 114) can be a generally similar image of the side depicted in FIG. 3 and thus the description provided herein below regarding portions 108, 112 can be applicable to the portions 110, 114. As shown in FIG. 3, the attachment portion 108 is generally planar having a first surface 128 opposite a second surface 130. The first surface 128 abuts the side rail 102 while the second surface 130 faces the interior cabin of the vehicle.

Apertures 132 can be formed through the attachment portion 108 for receiving suitable fasteners (not shown) therethrough. Securement of the attachment portion 108, however, is not limited to any one type fastener; rather, any means that mechanically fixes the attachment portion to the side rail can be utilized. In the illustrated embodiment, the attachment portion 108 affixes to the side rail 102 such that its longitudinal length coincides or is parallel with the length of the side rail.

As already mentioned, the support portion 112 depends downwardly from the attachment portion 108 toward the vehicular cabin. More specifically, in the illustrated embodiment, the support portion 112 depends downwardly from an innermost lateral edge 108a of the attachment portion 108. The illustrated support portion 112 includes a slight curvature along its longitudinal length, which can slightly flatten (i.e., flex) to extend an overall length of the support portion when the grab handle 104 is pulled on. As shown, the support portion 112 can be integral to the attachment portion 108.

In the illustrated embodiment, the at least one flange of the bracket 102 includes a first reinforcing flange 118 extending along a first longitudinal edge of the bracket 102 defined by the portions 108, 112 and a second reinforcing flange 120 extending along a second, opposite longitudinal edge of the bracket 102 defined by the portions 110, 114. Both flanges 118, 120 have first ends 118a, 120a disposed along respective longitudinal edges approximately centrally on the attachment portion 108 and extending along the portion 108 to the support portion 112. From the support portion 108, the flanges 118, 120 extend a limited distance to second ends 118b, 120b disposed at a location spaced apart from the interconnecting portion 116.

Along the attachment portion 108, flanges 118, 120 at the illustrated embodiment depend downwardly from the second surface 130 and are oriented approximately orthogonal relative to the surface 130. In the illustrated embodiment, the reinforcing flanges 118, 120 start at a point (i.e., at ends 118a, 120a) along the attachment portion 108 that is spaced inward a distance from the outermost lateral edge of the attachment portion 108.

The interconnecting portion 116 can be integral to the support portions 112, 114. The interconnecting portion 116 extends perpendicularly inward from a width of the support portions 112, 114. In one embodiment, the interconnecting portion 116 extends perpendicularly inward from the lower lateral edge of the support portions 112, 114. As shown, the interconnecting portion can include an inward step 134 along its middle length. The interconnecting portion 116 can also include at least one means to secure the grab handle 104 to the mounting bracket 102. For example, FIG. 4 shows an aperture 136 through the interconnecting portion 116 for a fastener (not shown) to mechanically join the grab handle 104 to the mounting bracket 102.

While the illustrated embodiment includes flanges 118, 120 disposed along both longitudinal edges with flanges 118, 120 parallel to one another, it is to be appreciated that only a single flange disposed along a single longitudinal edge could be provided in an alternate embodiment (i.e., one of flanges 118, 120 could be eliminated). Also, while the lengths of the flanges 118, 120 are shown as being the same in the illustrated embodiment, it is to be appreciated that a length of the second reinforcing flange 120 can vary from that of the first reinforcing flange 118 when both flanges are included. In the illustrated embodiment, the first reinforcing flange 118 and the second reinforcing flange 120 are equal in length, and both reinforcing flanges begin along the respective longitudinal edges at points that share a plane transverse the attachment portion 108.

Since the other side of the bracket 106 (i.e., the side not shown in FIG. 4) can be a generally similar or mirror image of the illustrated side, it should be appreciated that the bracket 106 can include a third reinforcing flange 122 extending along the first longitudinal edge (i.e., the same edge along which the flange 118 is disposed) from the second attachment portion 110 and a fourth reinforcing flange 124 extending along the second longitudinal edge (i.e., the same edge along which the flange 120 is disposed) from the second attachment portion 110. In the illustrated embodiment, the third and fourth flanges 122, 124 have dimensions and configurations that match the flanges 118, 120, though this is not required. For example, in the illustrated embodiment, all four flanges 118, 120, 122, 124 extend along respective attachment portions 108, 110 and then extend a limited distance along respective support portions 112, 114 from the attachment portions 108, 110 to a location or place spaced between and apart from the attachment portions 108, 110 and the interconnecting portion 116. In alternate configurations, any one or more of the flanges 118, 120, 122, 124 can be eliminated or configured differently (e.g., extending a different distance from the attachment portions 108, 110).

In the illustrated embodiment, the flanges 118, 120 extend along the attachment portion 108, then beyond a first of two ends (i.e., end 108a) and continue along the support portion 112 for a limited distance from the support portion 112 to a location spaced apart from the interconnecting portion 116. In other words, the flanges 118, 120 do not extend along an entire longitudinal length or extent of the support portion 112; instead, the flanges 118, 120 extend from a limited length of one or both (both in the illustrated embodiment) longitudinal edges of the support portion 112. The reinforcing flanges 118, 120 of opposite longitudinal edges can be unequal or equal in length and in width. In the illustrated embodiment, the reinforcing flanges 118, 120 generally mirror each other on opposing longitudinal edges. In one embodiment, the reinforcing flanges 118, 120 extend a limited distance that is from about one-third to about two-thirds a longitudinal extent of the first and second support portions. In one embodiment, the reinforcing flanges 118, 120 extend a limited distance that is less than about one half a longitudinal extent of the support portion 112. For example, as shown, the reinforcing flanges 118, 120 can extend a limited distance that is approximately one third a longitudinal extent of the support portion 112.

As shown in FIG. 3, the bracket 106 can additionally include weakened areas 126 defined in one or both (both in the illustrated embodiment) of the first and second support portions 112, 114. In the illustrated embodiment, the weakened areas 126 are apertures formed along or defined through the first and second support portions 112, 114. As shown, the apertures 126 of the illustrated embodiment are disposed between and spaced apart from the location at which the flanges 118, 120, 122, 124 end (e.g., at flange ends 118b, 120b in FIG. 3) and the interconnecting portion 116. With specific reference to FIG. 4, the aperture 136 of the illustrated embodiment is spaced apart from the lower lateral edge of the support portion 112. In one embodiment, the weakened area or aperture 126 is formed in a longitudinal half of the support portion 112 spaced apart from the attachment portion 108 and spaced from the interconnecting portion 116. In addition, the illustrated aperture 126 comprises a width that is less than a width of the support portion 112. For example, the aperture 126 can have a width that is no greater than one-half a width across the support portion 112. There is no limitation made herein, however, to a width of the aperture 126. In one embodiment, the aperture 126 can include a width that is greater than one-half the width across the support portion 112.

In the illustrated embodiment, only one of the weakened areas 126 (i.e., apertures) or at least one reinforcing flange (i.e., flanges 118, 120, 122, 124) is disposed in a plane extending transversely across a particular support portion 112 or 114 at any point along a longitudinal length of the same support portion. For example, as shown in FIG. 4, the reinforcing flange 118 terminates (at end 118b) before the most proximate lateral edge of the weakened area (i.e., aperture 126). In one embodiment, the reinforcing flange 118 can terminate along the longitudinal length of the support portion 112 immediately before a position where the aperture lateral edge is situated.

In the illustrated embodiment, both the flange 118 and the aperture 126 can be provided in a longitudinal half of the support portion 112 adjacent the attachment portion 108 and spaced apart from the interconnecting portion 116.

One advantage associated with the grab handle mounting bracket 106 described herein is that it provides the strength necessary to withstand the pull forces of a passenger pulling on the grab handle for stability.

Another advantage associated with the grab handle mounting bracket 106 is that it provides the flexibility necessary to give and to compress inwardly when it is a recipient of push forces. In this manner, the mounting bracket 106 can accept some of the onward impact it receives in instances when a passenger's head bumps into the mounting bracket 106 during vehicular collisions. The risk of head injuries caused thereby is reduced.

Still another advantage associated with the grab handle mounting bracket 106 is that it requires no redesign or repositioning of the attachment portions 108, 110 to accommodate securement of the attachment portions to a vehicular side rail 102.

A further advantage associated with the grab handle mounting bracket is that its construction is adaptable for mounting for all passenger rows in a vehicle.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A mounting bracket for a vehicle grab handle, comprising:
spaced apart first and second roof attachment portions for mounting to a roof side rail;
spaced apart first and second support portions depending downwardly toward a vehicle cabin, said first support portion depending from said first attachment portion and said second support portion depending from said second attachment portion;
an interconnecting portion extending between said spaced apart first and said second support portions for mounting the vehicle grab handle; and,
at least one reinforcing flange extending along at least one longitudinal edge defined by said roof attachment portions and said support portions, said at least one reinforcing flange extending along at least one of said first and second attachment portions, around a corner to a corresponding one of said first and second support portions and along said corresponding one of said first and second support portions from said at least one of said first and second attachment portions to a location substantially spaced apart from said interconnecting portion a distance sufficient to weaken said at least one of the first and second support portions to reduce a compression force required to crush said at least one of the first and second support portions.

2. The mounting bracket of claim 1, wherein said at least one reinforcing flange includes:
a first reinforcing flange extending along a first longitudinal edge from said first attachment position to said location; and,
a second reinforcing flange extending along a second longitudinal edge from said second attachment portion to said location.

3. The mounting bracket of claim 2, wherein said at least one reinforcing flange further includes:
a third reinforcing flange extending along the first longitudinal edge from said second attachment portion to said location; and,
a fourth reinforcing flange extending along the second longitudinal edge from said second attachment portion to said location.

4. The mounting bracket of claim 1, wherein said location is at a distance of less than about one half a longitudinal extent of said first and second support portions.

5. The mounting bracket of claim 1, wherein said location is at a distance of less than about one third to about two thirds a longitudinal extent of said first and second support portions.

6. The mounting bracket of claim 1, further including weakened areas defined respectively in said first and second support portions, the weakened areas reducing the amount of force required to deformably compress the support portions.

7. The mounting bracket of claim 6, wherein each weakened area is an aperture respectively defined through said first and second support portions.

8. A mounting bracket for a vehicle grab handle, comprising:
spaced apart first and second roof attachment portions for mounting to a roof side rail;
spaced apart first and second support portions depending downwardly toward a vehicle cabin, said first support portion depending from said first attachment portion and said second support portion depending from said second attachment portion;
an interconnecting portion extending between said spaced apart first and said second support portions for mounting the vehicle grab handle; and,
at least one reinforcing flange extending along at least one longitudinal edge defined by said roof attachment portions and said support portions, said at least one reinforcing flange extending from at least one of said first and second attachment portions a limited distance to a location spaced apart from said interconnecting portion; and at least one aperture defined through at least one of said first and second support portions, wherein said at least one aperture is disposed between and spaced apart from said location and said interconnecting portion.

9. The mounting bracket of claim 7, wherein only one of said apertures and said at least one reinforcing flange is disposed in a plane extending transversely across said first and second support portions at any point along longitudinal lengths of said support portions.

10. A bracket for a grab handle mounted to a vehicle side rail, comprising:
an attachment portion for mounting the grab handle to the side rail;
a support portion depending downwardly from said attachment portion;
at least one reinforcing flange depending downwardly from one or both longitudinal edges of said support portion and,
a weakened area formed along said support portion that reduces a compression force required to crush said support portion.

11. The bracket of claim 10, wherein said weakened area is an unreinforced aperture defined through said support portion.

12. The bracket of claim 11, wherein said aperture is formed in a longitudinal half of said support portion adjacent the attachment portion.

13. The bracket of claim 10, wherein said weakened area is an aperture and only one of said aperture and said at least one reinforcing flange is disposed in a plane extending transversely across said support portion at any point along a longitudinal length of said support portion.

14. The bracket of claim 10, wherein said at least one reinforcing flange includes a pair of reinforcing flanges respectively disposed on both longitudinal edges.

15. The bracket of claim 10, further including:
a second support portion depending downwardly from a second attachment portion;
a weakened area formed along said second support portion; and,
an interconnecting portion extending between said first and said second support portions.

16. A vehicle grab handle assembly mounted to a vehicle side rail, comprising:
a bracket including attachment portions for mounting to the vehicle side rail, support portions depending downwardly from said attachment portions, and an interconnecting portion extending between said support portions, said support portions including:
reinforcing flanges extending downwardly along one or both longitudinal edges of said support portion, said reinforcing flanges extending beyond a first of two ends of said support portions and continue along a limited length of longitudinal edges of said attachment portions, and,
an aperture formed through said support portions wherein only one of said aperture and said reinforcing flanges is situated in a plane extending transversely across said support portions at any point along longitudinal lengths corresponding to said aperture and said reinforcing flanges; and,
a grab handle secured to said interconnecting portion of said bracket.

17. The grab handle of claim 16, wherein said aperture has a width that is no greater than one-half a width of said support portions.

18. The mounting bracket of claim 8, wherein said at least one reinforcing flange includes:
a first reinforcing flange portion extending along a first longitudinal edge from said first attachment portion to said location;
a second reinforcing flange portion extending along a second longitudinal edge from said second attachment portion to said location;
a third reinforcing flange portion extending along the first longitudinal edge from said second attachment portion to another location spaced apart from said interconnecting portion; and,
a fourth reinforcing flange portion extending along the second longitudinal edge from said second attachment portion to said another location.

19. The mounting bracket of claim 8, wherein said limited distance is less than about one half a longitudinal extent of said first and second support portions.

20. The mounting bracket of claim 8, wherein said limited distance is approximately from about one third to about two thirds a longitudinal extent of said first and second support portions.

* * * * *